United States Patent [19]

Bucherl

[11] B 3,922,623

[45] Nov. 25, 1975

[54] ELECTRICAL FILTER WITH A NYQUIST FLANK CHARACTERISTIC

[75] Inventor: Erwin Bucherl, Munich, Germany

[73] Assignee: Siemens Aktiengesellschaft, Berlin and Munich, Germany

[22] Filed: Aug. 20, 1973

[21] Appl. No.: 389,807

[44] Published under the Trial Voluntary Protest Program on January 28, 1975 as document no. B 389,807.

[30] Foreign Application Priority Data

Aug. 22, 1972 Germany ........................ 2241159

[52] U.S. Cl. ............................ 333/70 R; 325/136

[51] Int. Cl.² .................... H03H 7/04; H04B 1/68

[58] Field of Search .......... 333/70 R; 325/136, 137

[56] References Cited

FOREIGN PATENTS OR APPLICATIONS 111,413 9/1940 Australia ......................... 325/137

*Primary Examiner*—James W. Lawrence
*Assistant Examiner*—Marvin Nussbaum
*Attorney, Agent, or Firm*—Hill, Gross, Simpson, Van Santen, Steadman, Chiara & Simpson

[57] ABSTRACT

An electrical filter with a Nyquist flank characteristic is provided for generating a vestigial side-band characterized in that two identical exact separating filters are connected in cascade in such a way that the output of one filter section in the first separating filter is connected to the input of the second separating filter, and in which a signal injected at the input passes through two filter sections having the same attenuation characteristics, and in that two of the filter sections of the separating filters are terminated in identical ohmic resistances, and in that the characteristic functions assigned to the filter sections are self-reciprocal functions.

6 Claims, 8 Drawing Figures

ELECTRICAL FILTER WITH A NYQUIST FLANK CHARACTERISTIC

BACKGROUND OF THE INVENTION

Field of the Invention

The present invention relates to an electrical filter with a Nyquist flank characteristic, for generating a vestigial side-band.

In the conversion of frequency bands, such for example, as video frequency bands, which in practice commence at zero frequency, it is recognized that in order to form a vestigial side-band, filters having a so-called Nyquist flank characteristic are required. For the design of filters of this kind, hitherto experimental or mathematical approximations have been utilized. Another possibility is known, for example, from Deutsche Offenlegungsschrift No. 1,541,660 as laid open for inspection, in which a separating network made up of three exact separating filters, is utilized. Also, from Deutsche Offenlegungsschrift No. 1,902,057, a method of filtering out a vestigial side-band signal is known, in which, using band-pass/band-stop separating filters, the band-pass filter being followed by an all-pass network and the band-stop filter by a single side-band filter, the outputs of the all-pass network and the single side-band filter being combined through an adder element, a Nyquist flank characteristic is generated. However, these known separating filter circuits involve a relatively large outlay in circuitry.

BRIEF SUMMARY OF THE INVENTION

The object of the present invention is to overcome the aforementioned difficulties and describe the design and construction of a filter in which the Nyquist condition can be met, at least in the flank zone of the characteristic, with high accuracy.

Commencing from a filter having a Nyquist flank characteristic, designed to generate a vestigial side-band, the object of this invention is achieved by providing two identical exact separating filters connected in cascade in such a fashion that at the output of one filter section in the first separating filter is connected to the input of the second separating filter, so that a signal injected at the input of the filter passing through two filter sections having the same attenuation characteristic; in that the two other filter sections of the separating filters are terminated in identical ohmic resistances; and in that the characteristic functions assigned to the attenuation functions of the filter sections, are self-reciprocal functions.

In particular, it is an object of this invention to provide a less elaborate modification in the form of a reactive four-terminal device which has an operating reciprocal transfer function $D_B = D_N^2$ where $D_N$ is the reciprocal transfer function of one of the filter sections in the separating network.

Other objects, features and advantages of the present invention will become apparent from the following description taken in conjunction with the accompanying drawings.

DESCRIPTION OF THE PREFERRED EMBODIMENT

Figure 1:
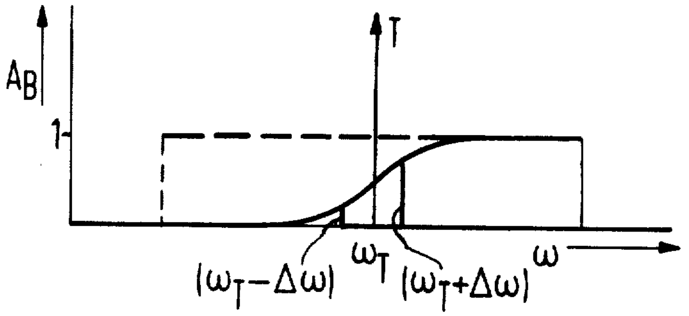
FIG. 1 illustrates the formation of a vestigial side-band, by means of a Nyquist filter.

As FIG. 1 shows, a Nyquist filter must satisfy the condition:

$$|A_B(\omega_T - \Delta\omega)| + |A_B(\omega_T + \Delta\omega)| = 1 \quad (1)$$

at least in the flank zone of the characteristic. When considering the phase on its own, in this expression, $A_B$ signifies the operating transfer function of the Nyquist filter, $\omega_T$ the carrier frequency and $\Delta\omega = \omega - \omega_T$ the deviation from the carrier frequency.

Equation (1) requires that the standardized voltages, arranged arithmetically symmetrically to the carrier at an interval of $\pm\Delta\omega$, shall complement one another after conversion, to yield the value 1.

This requirement of arithmetical symmetry cannot theoretically be precisely satisfied using filters made up of lumped components, even within a finite frequency range. Because the attenuation characteristic $a_B(\omega) = -\ln|A_B(\omega)|$ can only be arbitrarily specified in the frequency interval $0$—$\omega_T$ or $\omega_T$—$2\omega_T$ etc., and because in addition to equation (1) the condition of realizability $$a_B(\omega) = a_B(-\omega)$$

must be satisfied, the predetermined frequency response would have to be infinitely repeated within the frequency range from $-\infty$ to $+\infty$, and this is something which could only be achieved at the expense of infinite outlay.

The following considerations are, therefore, based upon the attainable geometric symmetry of $$\omega_1\omega_2 = \omega^2_T$$

where $$\omega_2 = \omega^2_T/\omega_1 = \omega^2_T/(\omega_T - \Delta\omega) = \omega_T + \Delta\omega + (\Delta\omega)^2/\omega_T + \ldots$$

If the Nyquist condition equation (1) is modified accordingly, then we obtain the condition $$|A_B(\omega_1)| + |A_B(\omega_T^2/\omega_1)| = 1 \quad (2a)$$

or $$e^{-a_B(\omega_1)} + e^{-a_B(\omega_T^2/\omega_1)} = 1. \quad (2b)$$

Because the Nyquist condition (1) generally, in practice, at any rate, only has to be satisfied in the flank zone between pass limit $\omega_d$ and blocking limit $\omega_s$, arithmetic symmetry can be replaced with sufficient accuracy by geometric symmetry if, for the flank zone $|\omega_s - \omega_d|$ we set the condition $$\left|\frac{\omega_s-\omega_d}{\omega_T}\right| \leq 30\% \qquad (3)$$

in relation to the carrier frequency $\omega_T$. The difference between geometric and arithmetic symmetries is then $$\frac{\omega_2-(\omega_T+\Delta\omega)}{\omega_T} \leq \left|\frac{\omega_s-\omega_d}{2\omega_T}\right|^2 \left[1-\left|\frac{\omega_s-\omega_d}{2\omega_T}\right|\right]^{-1} = 2.65\%$$

Figure 2:
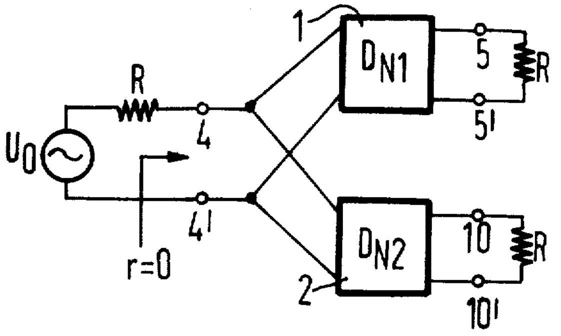
FIG. 2 diagrammatically illustrates an exact frequency separating network, consisting of two mutually conjugate filter sections connected in parallel at the input ends.
Figure 3:
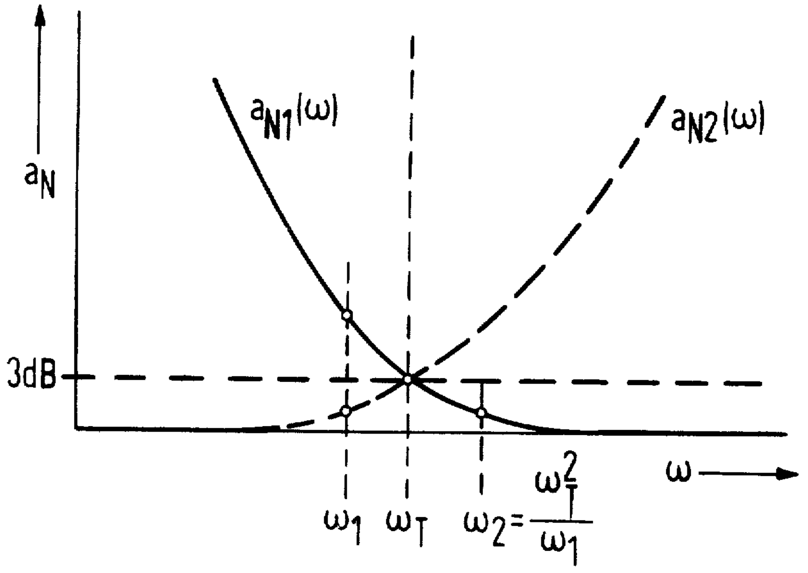
FIG. 3 illustrates schematically the attenuation characteristic of an exact frequency separating network, in the crossover zone.

Making reference to FIGS. 2 and 3, the relationship between the Nyquist condition and the transfer response of exact frequency separating filters, will be illustrated. In the known circuit of an exact frequency separating filter, as illustrated in FIG. 2, two filter sections 1 and 2 with the reciprocal transfer functions $D_{N1}$ and $D_{N2}$, are connected in parallel at the common terminals of the separating circuit, i.e., at the terminals 4, 4'. The circuit is supplied from a voltage source $U_0$ of internal resistance R. The output terminals of the first filter are marked 5 and 5' and those of the second filter 10 and 10'. The individual filter sections are again terminated in the resistance R. The fundamental attenuation response $a_N = \ln|D_N|$ as a function of frequency $\omega$, has been shown in FIG. 3. As those skilled in the art will appreciate, an exact frequency separating filter consists of two mutually conjugate filter sections which are connected in parallel (or in series) at the input. The characteristic functions $\varphi_\gamma$ | of the two filter sections are mutually reciprocal so that the reflection factor $r$ at the common pair of terminals (apex of the separating filter) is zero at all frequencies.

For exact separating filters therefore, the following energy balance generally applies $$e^{-2a_{N1}(\omega)} + e^{-2a_{N2}(\omega)} = 1 \qquad (4)$$

because the reactive filters 1 and 2 consume no energy and by definition no energy is reflected at the common pair of terminals 4, 4'. If, as illustrated in FIG. 3, frequency symmetry is required between the attenuation responses $a_{N1}(\omega)$ and $a_{N2}(\omega)$, then $$a_{N2}(\omega) = a_{N1}(\omega_T^2/\omega). \qquad (5)$$

Substituting equation (5) in equation (4) we obtain $$e^{-2a_{N1}(\omega)} + e^{-2a_{N1}(\omega_T^2/\omega)} = 1. \qquad (6)$$

It can now be seen that the modified Nyquist condition equation (*2b*) is identical to the equation (6) if $$a_B(\omega) = 2a_{N1}(\omega). \qquad (7)$$

Figure 4:
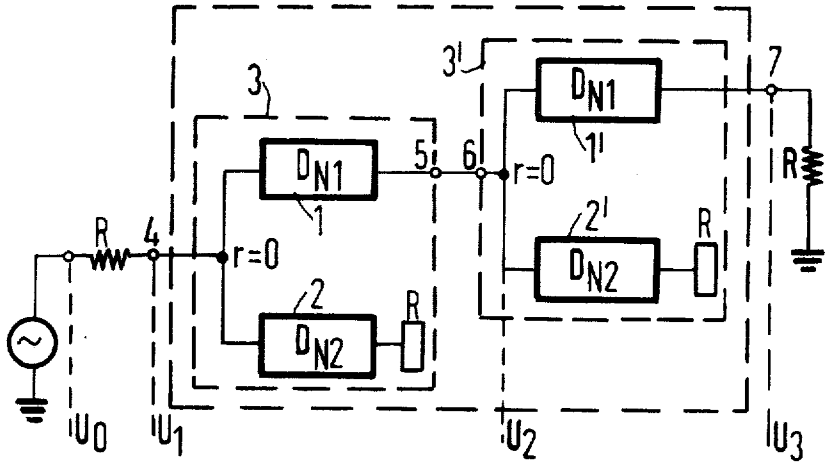
FIG. 4 illustrates the cascade connection of two identical exact frequency separating networks, in order to form a Nyquist filter.

From equations (6) and (7) it is clear that the cascade arrangement of two exact separating filters in accordance with FIG. 4, which have mutually frequency-reciprocal attenuation in the filter sections, has the properties, from the geometric symmetry aspect, of a Nyquist filter.

In order to form a filter with a Nyquist flank in its characteristic, for example as in FIG. 4, two identical exact frequency separating filters 3 and 3' of the kind shown in FIG. 2, are connected in cascade, a block diagram being utilized to simplify the illustration, and parts of the circuit corresponding to those already shown in FIG. 2, having been given the same references. In the circuit shown in FIG. 4, at the common terminals 4 of the separating filter, the voltage $U_1$ is applied, this being produced by a voltage source, e.g., a modulator producing the output voltage $U_0$. The first frequency separating filter 3, which has been shown in a broken line box, again consists of the filter sections 1 and 2. The output 5 of the section 1 is followed by the input 6 of the second frequency separating filter 3', which is again shown in a broken-line box. The second frequency separating filter again consists of the parallel arrangement of two sections 1' and 2' and the output 7 of the filter section 1' at the same time does duty as the output of the overall circuit which is terminated in the resistance R.

Thus, at the input 6 of the second separating filter, there is the voltage $U_2$, and at the output the voltage $U_3$. The filter sections 2 and 2' are likewise terminated in ohmic resistances R. The filter sections 1 and 1' have identical reciprocal voltage transfer factors $D_{N1}$, and likewise the filter sections 2 and 2' have identical reciprocal voltage transfer factors $D_{N2}$.

Because, by definition, the apex reflection factor of exact separating filters is zero, taking the designations contained in FIG. 4, we obtain for the operating reciprocal transfer factor $$D_B(\omega) = 1/A_B(\omega) = (U_0/2)/U_3 = (U_0/2)/U_1 \cdot (U_1/U_2) \cdot (U_2/U_3) = D_{N1}^2(\omega) \qquad (8a)$$

and for the operating attenuation $$a_B(\omega) = \ln|D_B(\omega)| = 2\ln|D_{N1}(\omega)| = 2a_{N1}(\omega) \qquad (8b)$$

where $D_{N1}(\omega)$ and $D_{N2}(\omega)$ are the reciprocal transfer voltage factors of the mutually conjugate and frequency-reciprocal separating filter sections, and $a_{N1}(\omega)$ is the voltage attenuation constant assigned to the filter section 1.

The characteristic function $\varphi_{N\gamma}$, which combined in the following fashion with the reciprocal transfer factor $D_{N\gamma}$, in accordance with the rules of operating parameter theory, $$|D_{N\gamma}(\omega)|^2 = 1 + |\varphi N(\omega)|^2, \qquad (9)$$

must satisfy the following requirements:

a. condition for exact separating filters $$|\varphi_{N2}(\omega)| = 1/|\varphi_{N1}(\omega)| \qquad (10)$$

b. condition for frequency-reciprocity $$|\varphi_{N2}(\omega)| = |\varphi_{N1}(\omega_T^2/\omega)| \qquad (11)$$

From equations (10) and (11), we obtain as a resultant the condition of self-reciprocity for the characteristic functions of the filter sections $$\varphi_{N1}(\omega) = 1/[\varphi_{N1}(\omega_T^2/\omega)] \qquad (12)$$

Characteristic functions are associated with the attenuation functions. These characteristic functions are self-reciprocal functions. Mathematically, this relationship is expressed by way of the equations (8a) to (12).

As can be shown, the equations (8a) and (12) are not only necessary but also sufficient to produce a Nyquist filter in the geommetrically symmetrical sense. If, in accordance with equations (8a) and (9) we put $$A_B(\omega) = 1/|D_B(\omega)| = 1/1+|\varphi_N(\omega)|^2 \quad (13a)$$

and $$A_B(\omega^2_T/\omega) = 1/|D_B(\omega_T^2/\omega)| = 1/1+|\varphi_N(\omega_T^2/\omega)|^2 \quad (13b)$$

then by addition of equations (13a/b), and taking into account equation (12), we again obtain the modified Nyquist equation (2a).

Thus, if for the synthesis of a Nyquist filter we use a function having the properties of equation (12), and if we take account of the restriction on the out of balance equation (3), which is admissible in practice, the circuit of FIG. 4 with the reciprocal transfer function $D_B = D_N^2$, will inevitably, and irrespective of the blocking attenuation which is chosen, have a Nyquist flank which satisfies the condition (1) with the exception of a small error which is permissible in practice, as will be demonstrated hereinafter.

The four-terminal impedance of FIG. 4, hitherto used as an example and whose reflection factor at the common pair of terminals 4 is zero at all frequencies, is often too elaborate for practical purposes.

In accordance with a further development of the principle of the invention, therefore, using the rules of operating parameter theory, the associated characteristic function $\varphi$ of the reciprocal transfer functions $D_B = D_N^2$, is determined and from these two functions a reactive four-terminal network calculation. This four-terminal network, in pass-band and stop band, possesses exactly twice the operating attentuation of a filter section of an exact separating filter in accordance with FIG. 4, i.e., in addition to twice the blocking attenuation also twice the ripple. All the poles and zeros in the reciprocal transfer function $D_B$ are of second order.

If it is simply the overall function $$D_B(\omega)^2 = [\,1 + |\varphi_N(\omega)|^2\,]^2$$

which is to be produced, the characteristic sub-function $\varphi_N$ can also be formed as the quotient of two arbitrary polynominals with mutually reciprocal zeros. In this case, again $D_B(\omega)$ necessarily has double zeros in the left-hand half-plane of the complex frequency plane, but not necessarily double poles, rather pole quadrupals, something which can advantageously be exploited if the delay time of the Nyquist filter is also to be corrected.

The reflex loss $a_r$ of the Nyquist filter in the pass band, is at the most ln $\sqrt{2}\,N_r$ less, in accordance with the equation $$a_r(\omega) = \ln\,|1/\varphi_N(\omega)| - \ln\frac{\sqrt{2+|\varphi_N(\omega)|^2}}{1+|\varphi_N(\omega)|^2} \quad (14)$$

than the modulus of the characteristic attenuation ln $\varphi_N$ which has been taken for one separating filter section. The frequency response determined by the characteristic function $\varphi_N(\omega)$, for example, a Tschebysheff response, is maintained. The return loss level $a_{rmin}$ cannot be arbitrarily chosen but is linked by the relationship (15)

$$a_{rmin} = 0.5\,a_{bmin} - \ln\sqrt{2-e^{-a_{bmin}}}$$

with the blocking attenuation level $a_{bmin}$.

The operating group delay, which often plays an important part because of the expensive equalization, is determined by the required operating attenuation because the network is of minimal phase type.

In the following, the individual steps of calculation in order to determine the characteristic function $\varphi$ of a Nyquist filter will be followed through on the basis of a high-pass function.

The design commences with the choice of a self-reciprocal characteristic function according to equation (12) which satisfies half the blocking attenuation requirement or the reflex attenuation requirement, corresponding to equation (15). The standardized values $\Omega_\nu = \omega_\nu/\omega_T$ of the attenuation poles can, for example, be extracted from any of the known low-pass filter catalogues, where transmission and blocking attenuation have Tschebysheff characteristics, and, if not already done, should be converted to the geometric mean of pass-band and blocking-band limits. Geared to high-pass filters with a single pole at $\Omega = 0$, $\varphi_N$ according to equation (12), has the form $$\varphi_N(p) = \frac{1}{p}\prod_{\nu=1}^{n}\frac{(p^2\Omega_\nu^2+1)}{(p^2+\Omega_\nu^2)}, \quad (16)$$

where $p = j\,\Omega$

Expressed in terms of the poles $\Omega_{\infty\nu}$ and zeros $\Omega_{o\nu}$ from equation (16) we obtain $$\varphi_N(p) = \frac{K}{p}\prod_{\nu=1}^{n}\frac{(p^2+\Omega_{o\nu}^2)}{(p^2+\Omega_{\infty\nu}^2)} \quad (17)$$

where $\Omega_{o\nu} = 1/\Omega\infty\nu$ and $$K = \prod_{\nu=1}^{n}\Omega_o^2\nu.$$

Through the relationship $$\varphi_N(p)\,\varphi_N(-p) + 1 = D_N(p)\cdot D_N(-p) \quad (18)$$

we obtain the associated reciprocal transfer function $$D_N(p) = \frac{(p+r)}{p}\cdot\prod_{\nu=1}^{n}\frac{(p^2+pM\nu+N\nu)}{(p^2+\Omega_{\infty\nu}^2)} \quad (19)$$

whose zeros, if $\varphi_N$ exhibits precise self-reciprocity, are located upon the unit circle (all $N\nu = r = 1$). The Nyquist filter has the reciprocal transfer function of $D_B(p) = D_N^2(p)$. The associated characteristic function which is necessary in order to achieve i.e. for the cascade matrix, is determined by the equation $$D_N^2(p)\,D_N^2(-p) - 1 = [D_N(p)D_N(-p) - 1]\cdot[D_N(p)D_N(-p) + 1] = \varphi_N(p)\cdot\varphi_N(-p)\,\Phi_N(p)\,\Phi_N(-p) \quad (20)$$

As equation (20) shows, this function is the product of the original function $\varphi_N(p)$ according to equation (17), and a new as yet unknown function $\phi_N(p)$ of the same degree. Thus, taking into account equation (18), the relationship between $D_N(p)$ and $\phi_N(p)$ can be described more simply by the expression $$D_N(p)\, D_N(-p) + 1 = \phi_N(p)\, \phi_N(-p) \tag{21}$$

for by $$\varphi_N(p)\, \varphi_N(-p) + 2 = \phi_N(p)\, \phi_N(-p) \tag{22}$$

It would not be a good idea to determine $\varphi_N \phi_N$ in accordance with equation (20) in a single step, because this equation includes the fourth degree of the basic equation and also double zeros on the imaginary axis which, utilizing the conventional method of determining zero positions, can only be determined to "half accuracy", i.e., only to half the number of decimal places employed for calculation. It is a better and more accurate procedure, to treat equation (21) formally like equation (18) and to determine $\phi_N$ separately.

The characteristic function of the Nyquist filter, $\varphi(p) = \varphi_N(p)\, \phi_N(p)$, if no quadrupals are present, and because of equation (8*a*) contains all the attenuation poles of $\varphi_N(p)$ in duplicate, but because of equations (18) and (20), contains all the zeros of $\varphi_N(p)$ only once. Because of equation (22) the zeros of $\phi_N(p)$ cannot be located upon the $j\Omega$ axis. Therefore, the characteristic function $\varphi_N\, \phi_N$ takes the form $$\varphi = \varphi_N \phi_N = \varphi_N \frac{\sqrt{2}\,(p+a)}{p} \prod_{\nu=1}^{n} \frac{(p^2+pm_\nu+n_\nu)}{(p^2+\Omega^2_{\infty\nu})}$$

$$= \frac{K\sqrt{2}\,(p+a)}{p^2} \prod_{\nu=1}^{n} \frac{(p^2+\Omega^2_{o\nu})\,(p^2+pm_\nu+n_\nu)}{(p^2+\Omega^2_{\infty\nu})^2} \tag{23}$$

The calculation of the values of the circuit elements, can now be performed in accordance with the rules of operating parameter theory.

Figure 5:
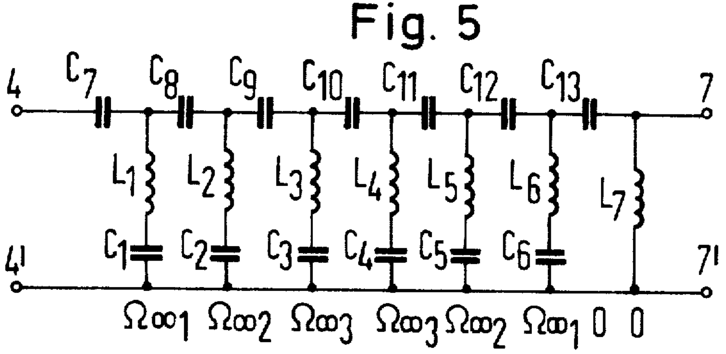
FIG. 5 is the circuit diagram of a high-pass filter with a Nyquist flank characteristic.

Utilizing the aforedescribed method, the circuit shown in FIG. 4 can be modified to form a reactive four-terminal device which has the operating reciprocal transfer function $D_B = D_N^2$, $D_N$ is the reciprocal transfer function of one of the filter sections 1 or 2 of the separating filter 3 or 3'. An example of this kind has been illustrated in FIG. 5 in the form of a Nyquist high-pass filter whose input terminals (similar to the example shown in FIG. 4) are marked 4 and 4' and its output terminals 7 and 7'. It can be seen, therefore, that the reactive four terminal device shown in FIG. 5 is suitable as an accurate substitute for the transmission response of the separating filter section shown in FIG. 4. The high-pass filter is designed as a ladder circuit whose shunt arms contain series resonance circuits with the coils $L_1$ to $L_6$ and the capacitors $C_1$ to $C_6$. In the terminal shunt arm, there is also a coil $L_7$. In the individual series arms, successive coupling capacitors $C_7$ to $C_{13}$ can be seen. The design of the following example is based upon the following requirements:

| | | |
|---|---|---|
| Attenuation band | f=0–0.862 MHz | $a_B \geqslant 9\ N_p$ |
| Pass-band | f=1.162–2.032 MHz | $a_r \geqslant 3.5$ Np |
| Carrier frequency | $f_T$=1. MHz | |
| Range of the Nyquist flank | 2 Δf=300 kHz | (2 $\Delta f/f_T$=29.6%) |

Because of the relationship $D_B = D_N^2$, $\varphi_N$ must satisfy the half blocking attenuation requirement. The chosen characteristic function $\varphi_N$ according to equation (17), was determined from the book "Filter Design Tables and Graphs", 1966 by John Wiley and Sons. The tabulated low pass function is designated in this book as TPCO7, H = 49°. The zero positions of the reciprocal transfer function $D_N$ can be determined from equation (18) and those of the characteristic (Sub-) function $\phi_N$, from equation (21). All the zeros of $\phi_N$ were arbitrarily placed in the left-hand p-half-plane. Taking the pole sequence Ω∞1, Ω∞2, Ω∞3, Ω∞3, Ω∞2, Ω∞1 0,0, the removal of the poles of the primary no-load impedance $Z_{11}$ yields the circuits shown in FIG. 5 with the following values for the elements $L_1 \ldots L_7 \approx 9 \ldots 55$ / uH and $C_1 \ldots C_{13} \approx 2 \ldots 14$ nF.

A measure of the accuracy of the Nyquist flank is the relative $$\text{Deviation } \Delta_r = e^{-a_b(\omega_T - \Delta\omega)} + e^{-a_b(\omega_T + \Delta\omega)} - 1.$$

Figures 7, 8:
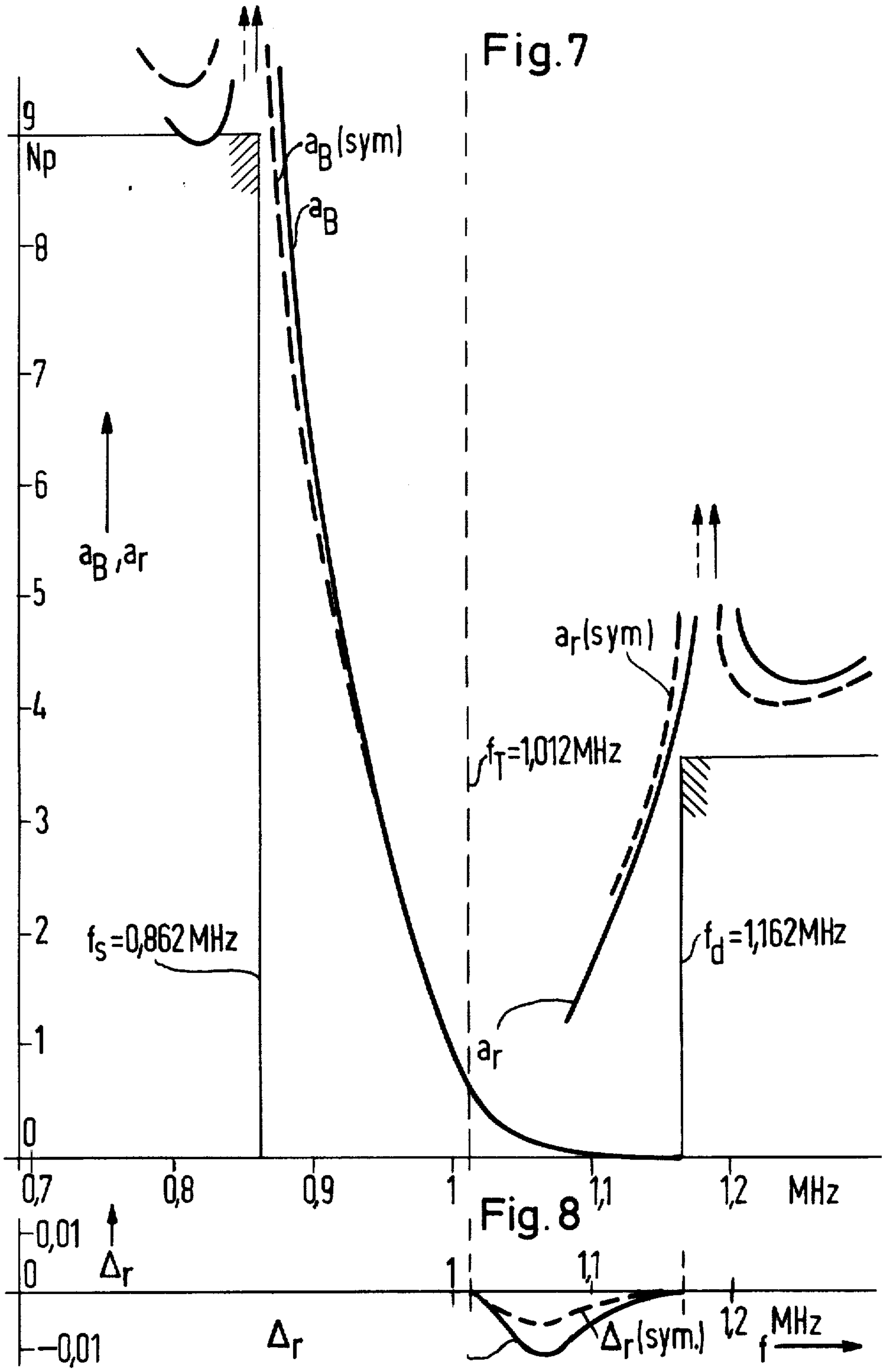
FIG. 7 illustrates the operating attenuation $a_B$ and the reflex attenuation $a_r$, of the Nyquist high-pass filter of FIG. 5, taking the frequency-reciprocal and the symmetrised case.
FIG. 8 illustrates the relative error $\Delta_r$ in the Nyquist high-pass filter of FIG. 5, taking the frequency-reciprocal and the symmetrised case.

The analysis of this relationship shows that in the frequency-reciprocal case | $\Delta_r$ (frequency-reciprocal) | is less than one percent in the flank range in 0.862 – 1.162 MHz. The operating attenuation $a_b$ (frequency-reciprocal) the reflex attenuation $a_r$ (frequency-reciprocal) and the relative deviation $\Delta_r$ (frequency-reciprocal), have been plotted in the flank zone, in FIGS. 7 and 8, as a function of the frequency *f*.

Figure 6:
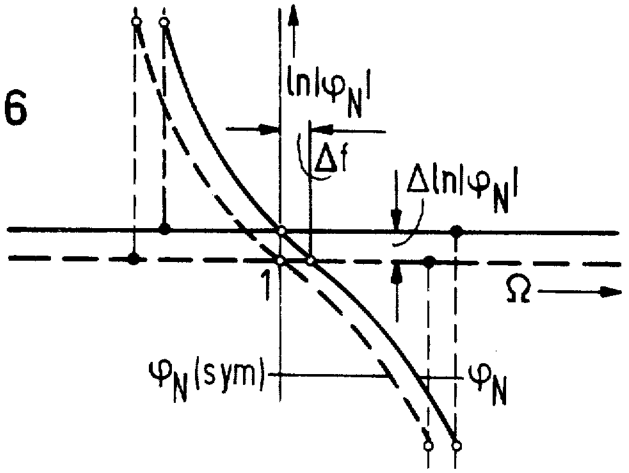
FIG. 6 illustrates the symmetrising of the characteristic function $\varphi_N(p)$.

If, in accordance with FIG. 6, which plots the logarithm of the characteristic function $\ln|\varphi_N|$ as a function of the standardized frequency Ω, symmetrizing of the original characteristic function $\varphi_N(p)$ is carried out in the flank zone, then the relative error $\Delta_r$ can be reduced to equal to less than 0.5 percent. For purposes of symmetrizing, the function $\varphi_N(p)$ is shifted with relation to the carrier so that the carrier is located on the arithmatic mean between pass band and attenuation band limits of $\varphi_N(p)$, and at the same time the constant K of $\varphi_N(p)$ must be modified so that $\ln|\varphi_N|$ becomes zero at the carrier frequency.

In the example shown in FIG. 5, the frequency shift is $\Delta f = 10$ kHz, and the modified constant is $K' = K.e^{0.23}$. The properties of the Nyquist filter with the symmetrized characteristic function, can also be seen in FIGS. 7 and 8, in the form of the broken-line curves.

The small loss-associated distortions of 0.08 Np occurring with the relatively wide gap, can be readily and actively compensated for by an attenuation equalizer, this having the advantage, as compared with incorporation of the losses by preliminary correction, that the reflex attenuation is not impaired, although extra cost is involved as a consequence. A correcting device of this kind can also be useful for fine adjustment of the flank.

The aforedescribed design of Nyquist filters leads directly (i.e., without any approximation) to a result which is sufficiently adequate for practical purposes and yields a type of filter which all the zeros and poles of the reciprocal transfer function are of the second order.

If, in specific cases, the accuracy attained without the introduction of an approximation technique, is insufficient, then the error $\Delta_r$ can be reduced by the use of an approximation technique involving only a few iterative steps, to less than 0.1 percent. It is possible, of course, using an approximation technique and without knowledge of the aforedescribed relationships, to approximate to a Nyquist flank characteristic even in filter circuits which only exhibit single attenuation positions. In all the approximation trials in which as the initial approximation a Cauer parameter filter was used, it was only possible, even using a large number of iteration steps, to achieve an accuracy of about 1 percent.

It will be apparent to those skilled in the art that many variations and modifications may be effected without departing from the spirit and scope of the novel concepts of the present invention.

I claim as my invention:

1. An electrical filter with a Nyquist flank characteristic for generating a vestigial side band comprising two identical strict divider filters each having a first filter section and a second filter section, the output of the first section of said first divider filter being connected to the input of the first section of the second divider filter, the circuit parameters being such that a signal injected at the input of said first divider filter will pass through said first section of said first filter and through the first section of said second filter with the same attenuation characteristic, said second section of each of said first and second filters being terminated in identical ohmic resistances, the attenuation functions $D_{N1}$ and $D_{N2}$ of said first and second filter sections of each of said divider filters being self-reciprocal functions.

2. An electrical filter as set forth in claim 1 which is constructed to form a reactive four-terminal device with the operating reciprocal transfer function $D_B = D_N^2$, where $D_N$ is the reciprocal transfer function of one of the filter sections of the separating filter.

3. An electrical filter as set forth in claim 1, in which the characteristic functions of the filter section are symmetrized as far as the Nyquist flank characteristic is concerned.

4. An electrical filter as set forth in claim 2, in which the characteristic functions of the filter section are symmetrized as far as the Nyquist flank characteristic is concerned.

5. An electrical filter as set forth in claim 2, in which the reactive four-terminal device is designed as a ladder network.

6. An electrical filter as set forth in claim 4, in which the reactive four-terminal device is designed as a ladder network.

* * * * *